US010628381B2

(12) United States Patent
Reimer et al.

(10) Patent No.: US 10,628,381 B2
(45) Date of Patent: Apr. 21, 2020

(54) OPTIMIZED CONTENT OBJECT STORAGE SERVICE FOR LARGE SCALE CONTENT

(71) Applicant: International Business Machines Corporation, Armonk, NY (US)

(72) Inventors: James A. Reimer, Morgan Hill, CA (US); Xiaoyang Yang, San Francisco, CA (US); Alan T. Yaung, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/358,993

(22) Filed: Nov. 22, 2016

(65) Prior Publication Data
US 2017/0154092 A1 Jun. 1, 2017

Related U.S. Application Data

(63) Continuation of application No. 14/954,733, filed on Nov. 30, 2015, now abandoned.

(51) Int. Cl.
*G06F 7/00* (2006.01)
*G06F 16/13* (2019.01)
(Continued)

(52) U.S. Cl.
CPC ............ *G06F 16/13* (2019.01); *G06F 16/122* (2019.01); *G06F 16/162* (2019.01);
(Continued)

(58) Field of Classification Search
CPC ......... G06F 17/30194; G06F 17/30091; G06F 17/3028; G06F 16/162; G06F 16/13; G06F 16/215; G06F 16/273
(Continued)

(56) References Cited

U.S. PATENT DOCUMENTS 5,159,681 A * 10/1992 Beck ...................... G06K 15/00
358/1.17
6,268,927 B1 7/2001 Lo et al.
(Continued)

FOREIGN PATENT DOCUMENTS

CN 105740303 7/2016

OTHER PUBLICATIONS

Mell, P. and T. Grance, "The NIST Definition of Cloud Computing (Draft)", Sep. 2011, Computer Security Division Information Technology Laboratory National Institute of Standards and Technology, Total 7 pp.
(Continued)

*Primary Examiner* — Md I Uddin
(74) *Attorney, Agent, or Firm* — Konrad Raynes Davda & Victor LLP; Janaki K. Davda

(57) ABSTRACT

Provided are techniques for optimized content object storage service for large scale content. A content object file is created. An index entry for the content object file is created with a content object key and a content object location. The content object file is appended to an aggregated file on a storage node. In response to a request to retrieve the content object file from the aggregated file, the content object key is used to access the content object location that describes the storage node, a name of the aggregated file, an offset into the aggregated file, and a size of the content object file to retrieve the content object file.

21 Claims, 13 Drawing Sheets

(51) Int. Cl.
  *G06F 16/16* (2019.01)
  *G06F 16/215* (2019.01)
  *G06F 16/27* (2019.01)
  *G06F 16/23* (2019.01)
  *G06F 16/11* (2019.01)

(52) U.S. Cl.
  CPC ........ *G06F 16/215* (2019.01); *G06F 16/2322* (2019.01); *G06F 16/273* (2019.01)

(58) Field of Classification Search
  USPC .......................... 707/649, 741, 758, 999.102
  See application file for complete search history.

(56) References Cited

U.S. PATENT DOCUMENTS

| | | | |
|---|---|---|---|
| 7,155,464 B2 | 12/2006 | Belov | |
| 7,213,204 B1 | 5/2007 | Dutta | |
| 7,321,898 B1* | 1/2008 | Luo | G06F 17/30457 |
| 7,958,094 B2* | 6/2011 | Grack | G06F 17/30011 |
| | | | 707/662 |
| 8,140,602 B2 | 3/2012 | Hsu et al. | |
| 8,219,562 B1 | 7/2012 | Rothschild et al. | |
| 8,504,758 B1* | 8/2013 | McHugh | G06F 3/0608 |
| | | | 711/100 |
| 8,677,065 B1 | 3/2014 | Cousins | |
| 8,990,257 B2 | 3/2015 | Barton et al. | |
| 9,032,542 B2 | 5/2015 | Khosrowpour et al. | |
| 10,089,338 B2 | 10/2018 | Ji et al. | |
| 2003/0050790 A1 | 3/2003 | Chang et al. | |
| 2006/0236398 A1* | 10/2006 | Trakic | G06F 21/562 |
| | | | 726/24 |
| 2010/0011447 A1* | 1/2010 | Jothimani | G06F 21/6209 |
| | | | 726/27 |
| 2010/0306283 A1 | 12/2010 | Johnson et al. | |
| 2011/0246966 A1 | 10/2011 | Harron, III | |
| 2013/0204849 A1 | 8/2013 | Chacko | |
| 2013/0325914 A1* | 12/2013 | Aoki | G06F 17/30194 |
| | | | 707/827 |
| 2014/0040506 A1 | 2/2014 | Frachtenberg et al. | |
| 2016/0004721 A1 | 1/2016 | Iyer et al. | |

OTHER PUBLICATIONS

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Office Action 1, dated May 31, 2016, for U.S. Appl. No. 14/954,733, filed Nov. 30, 2015 by J.A. Reimer et al., Total 13 pp. [57368 (OA1)].

Response to Office Action 1, dated Aug. 29, 2016, for U.S. Appl. No. 14/954,733, filed Nov. 30, 2015 by J.A. Reimer et al., Total 17 pp. [57368 (ROA1)].

Supplemental Amendment, dated Nov. 22, 2016, for U.S. Appl. No. 14/954,733, filed Nov. 30, 2015 by J. A. Reimer et al., Total 7 pp. [57.368 (SuppAmend)].

List of IBM Patents or Patent Applications Treated as Related, Total 2 pp., Nov. 22, 2016.

U.S. Patent Application with U.S. Appl. No. 14/954,733, filed Nov. 30, 2015, entitled "Optimized Content Object Storage Service for Large Scale Content", invented by J.A. Reimer et al., Total 42 pp. [57.368 (Appln)].

Notice Regarding Non-Compliant Amendment, dated Sep. 29, 2016, for U.S. Appl. No. 14/954,733 (57.368), filed Nov. 30, 2015 by J.A. Reimer et al., Total 7 pages.

Restriction Requirement, dated Dec. 15, 2016, for U.S. Appl. No. 14/954,733 (57.368), filed Nov. 30, 2015 by J. A. Reimer et al., Total 4 pages.

U.S. Pat. No. 10,089,338, dated Oct. 2, 2018, is an English language equivalent of CN105740303, dated Jul. 6, 2016.

* cited by examiner

200

| Content Object Name | Content Object Version | Content Object Key | Content Object Location ||||
|---|---|---|---|---|---|---|
| | | | Address | Name | Offset | Size |
| claim.tif | 1 | 3e6c90ad8f108b31 | 9.11.22.33 | File_0 | 3d40 | 13540 |
| claim.tif | 2 | a16c90ad8f19ab50 | 9.11.22.33 | File_1 | 10a2 | 14550 |
| auto.gif | 1 | b2ec90ad8f1d4671 | 9.11.22.33 | File_0 | a790 | 20970 |

FIG. 2

OPTIMIZED CONTENT OBJECT STORAGE SERVICE FOR LARGE SCALE CONTENT

FIELD

Embodiments of the invention relate to optimized content object storage service for large scale content.

BACKGROUND

Enterprise Content Management (ECM) systems are facing a common challenge in dealing with growing data volume within a cloud computing environment. Distributed object stores and file systems are the underpinnings of content object storage. Many of those ECM systems are designed to leverage a cluster of commodity hardware. Each node in the cluster is a commodity server with many locally attached hard disks, which may be referred to as a storage node. The cluster scales horizontally as more storage nodes are added.

By analyzing the content objects typically stored in a content management system, a determination was made that a high percentage of the content objects are relatively small in size. This translates to a large number of small files (e.g., several kilobytes or less per file) for the content objects. However, the large number of those small files may have an impact to the scalability of the object storage because they cause a lot of overhead in handling file Input/Output (I/O) of small files.

Transactional ECM systems store small content objects into the underneath file systems in which the overhead of the index node associated with each file roots the small object problem, where an index node is a data structure used to represent a file system object. As a result of a large number of small files, a large number of index nodes cause overhead. Some archival ECM systems store only the aggregated larger files batch-packed from the small files outside of the repositories, which makes the archival ECM systems read-only and non-transactional.

SUMMARY

Provided is a method for optimized content object storage service for large scale content. The method comprises: creating a content object file; creating an index entry for the content object file with a content object key and a content object location; appending the content object file to an aggregated file on a storage node; and, in response to a request to retrieve the content object file from the aggregated file, using the content object key to access the content object location that describes the storage node, a name of the aggregated file, an offset into the aggregated file, and a size of the content object file ("content size") to retrieve the content object file.

Provided is a computer program product for optimized content object storage service for large scale content. The computer program product comprising a computer readable storage medium having program code embodied therewith, the program code executable by at least one processor to perform: creating a content object file; creating an index entry for the content object file with a content object key and a content object location; appending the content object file to an aggregated file on a storage node; and, in response to a request to retrieve the content object file from the aggregated file, using the content object key to access the content object location that describes the storage node, a name of the aggregated file, an offset into the aggregated file, and a size of the content object file to retrieve the content object file.

Provided is a computer system for optimized content object storage service for large scale content. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform: creating a content object file; creating an index entry for the content object file with a content object key and a content object location; appending the content object file to an aggregated file on a storage node; and, in response to a request to retrieve the content object file from the aggregated file, using the content object key to access the content object location that describes the storage node, a name of the aggregated file, an offset into the aggregated file, and a size of the content object file to retrieve the content object file.

With the aggregation of content object files into an aggregated file, the overhead of handling file I/O is advantageously reduced to the aggregated file (versus I/O when processing each of the content object files separately).

Embodiments determine a number of aggregated files based on an available amount of storage. This advantageously determines an optimum number of aggregated files.

With embodiments, the content object file is uniquely identified using the content object key and the content object location. This advantageously provides a simple way to identify different content object files.

With embodiments, the metadata for the content object file includes at least one of a timestamp of creation, a delete flag, an on-hold flag, and a checksum. This advantageously allows setting of flags to indicate whether the content object file should be deleted or is on hold.

With embodiments, different versions of the content object file are appended to the aggregated file. This advantageously allows different versions to be in a single aggregated file.

With embodiments, one of updating the content object file, retrieving the content object file, and deleting the content object file from the aggregated file is performed. This advantageously allows for transactional operations.

With embodiments, a replication policy is implemented. With this, the replication of the content object file from a storage node to another storage node is advantageously simpler.

BRIEF DESCRIPTION OF THE SEVERAL VIEWS OF THE DRAWINGS

Referring now to the drawings in which like reference numbers represent corresponding parts throughout:

FIG. 2 illustrates an example indexing structure in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments efficiently store a large amount of multi-version content object files to support a content management system in a cloud computing environment.

Figure 1:
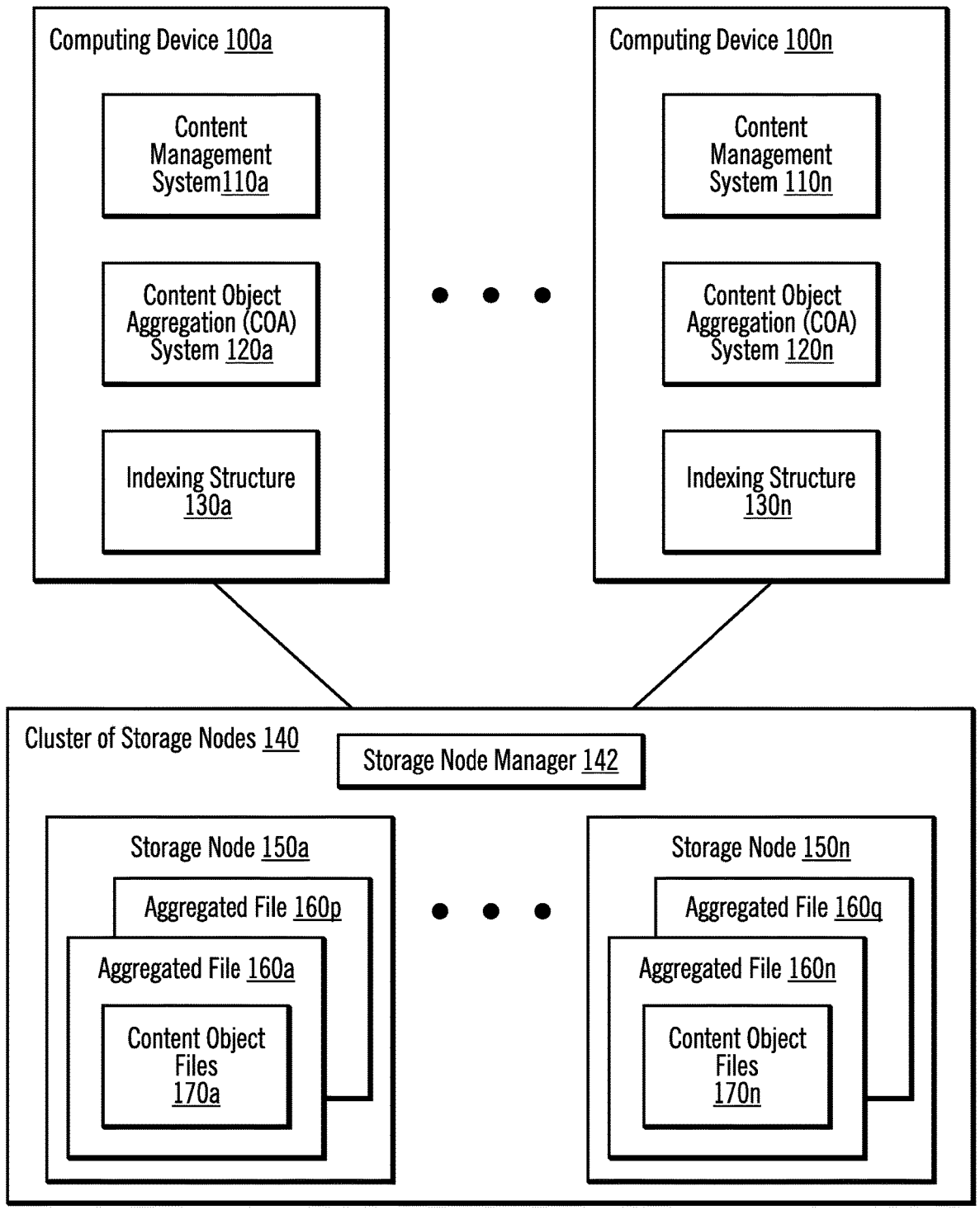
FIG. 1 illustrates, in a block diagram, a computing environment in accordance with certain embodiments.

FIG. 1 illustrates, in a block diagram, a computing environment in accordance with certain embodiments. In FIG. 1, computing devices 100*a* . . . 100*n* are coupled to a cluster of storage nodes 140. The cluster of storage nodes 140 includes a storage node manager 140 and storage nodes 150*a* . . . 150*n*. The ellipses indicates that there may be any number of computing devices and storage nodes. In certain embodiments, the storage nodes 150*a* . . . 150*n* are server computers.

Each of the computing devices 100*a* . . . 100*n* includes a content management system 110*a* . . . 110*n*, a Content Object Aggregation (COA) system 120*a* . . . 120*n*, and a indexing structure 130*a* . . . 130*n*.

Each of the storage nodes 150*a* . . . 150*n* stores aggregated files that include content object files. For example, storage node 150*a* includes aggregated files 160*a* . . . 160*p*, and aggregated file 160*a* includes content object files 170*a*. As another example, storage node 150*n* includes aggregated files 170*n* . . . 170*q*, and aggregated file 160*n* includes content object files 170*n*.

In certain embodiments, each of the aggregated files stores multiple, smaller content object files, and larger content object files are stored independently of the aggregated files.

In certain embodiments, a content object is equivalent to a file ("content object file") in a file system. The terms "content object" and "content object file" may be used interchangeably herein. For example, an auto claim form may be a Tagged Image File (TIF) content object file, and a car accident photo may be a Graphical Image File (GIF) content object file. Each content object file is uploaded and is stored individually into the file system on a storage node of a transactional content management system that persists the file location (e.g. C:/dir01/subdir08/file0101). "Transactional" may be described as allowing Create, Retrieve Update and Delete (CRUD) operations. Each of the CRUD operations is a transaction. On the contrary, "archival" may be described as allowing a read-only operation.

The COA system 120*a* . . . 120*n* implements a dynamic and in vivo aggregation of multi-version content object files into a small number of aggregated files per storage node. With embodiments, each content object file is uploaded and is appended onto the end of a pre-allocated large aggregated file. For example, on a storage node with 10 one-terabyte hard disk capacity, the COA system 120*a* . . . 120*n* may designate 20 aggregated files for aggregated content object files per hard disk, where each physical file is about 50 gigabytes in size. With embodiments, the number of pre-allocated aggregated files and aggregated file size are configurable. This advantageously allows configuration based on, for example, available amount of storage.

The COA system provides a indexing structure for efficiently managing those aggregated content object files in aggregated files. With the aggregation of content object files into a small number of aggregated files, the overhead of handling file I/O is advantageously reduced to the small number of aggregated files (versus I/O when processing each of the content object files separately). In addition, the replication of content object files from a storage node to another storage node is advantageously simpler. Although embodiments address the content management area, embodiments are applicable to other application areas in a cloud computing environment.

Embodiments provide: content object indexing, log structured aggregation for content object files, Create, Retrieve Update and Delete (CRUD) operations for content object files, content on-hold for retention management, and storage node management (provisioning and replication).

FIG. 2 illustrates an example indexing structure 200 in accordance with certain embodiments. In the indexing structure 200, the "Content Object Name" column describes the name of a content object file. The content object name of the content object file may be a typical file name (e.g., "claim-.tif" for an auto claim) or a well-formed file path (e.g., "/home/auto/claim.tif"). The file name may be a logical file name that maps to a physical file name on a storage node.

In the indexing structure 200, the "Content Object Version" column indicates the version of the content object file, if versioning is enabled for the content object files. If versioning is not enabled, the content object version number remains "1". In the indexing structure 200, the "Content Object Key" column is key (e.g., a 64-bit hash key) that is used in conjunction with the "Content Object Location" column to uniquely identify a content object file in the aggregated file residing on a storage node.

The example in FIG. 2 shows the hash key in hexadecimal merely for illustration purposes. The "Content object location" column consists of 4 sub-columns: "Address", "Name", "Offset", and "Size". The "Address" column indicates either the Internet Protocol (IP) address (e.g., 9.11.22.33) or a fully qualified host name (e.g., www.myhost.com) of a storage node. The "Name" column shows the file name of an aggregated file that consists of a collection of smaller content object files. The "Offset" column indicates the offset location of a content object file in the aggregated file, while the "Size" column indicates the size of the content object file along with some additional information (e.g., house-keeping information).

With embodiments, an individual content object file is appended to a pre-allocated log structured aggregated file. With a pre-allocated log structured aggregated file, the content object file is appended into the aggregated file sequentially with a pre-defined format dynamically. The pre-allocated log structured aggregated file is uploaded, versus, in an archival ECM system in which only batch-packed files are uploaded.

Figure 3:
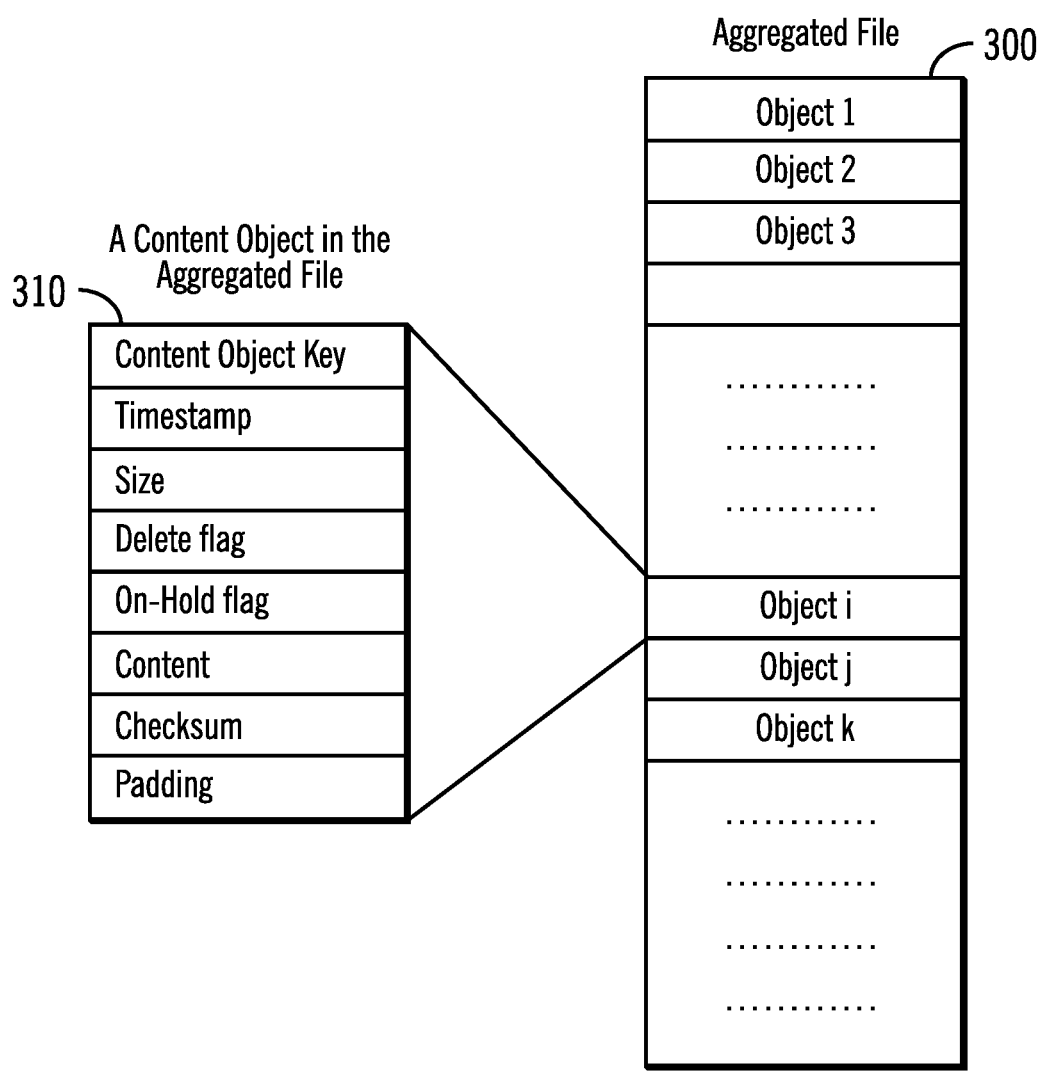
FIG. 3 illustrates an example of how a content object may look like in an aggregated file in accordance with certain embodiments.

FIG. 3 illustrates an example of how a content object file may look like in an aggregated file 300 in accordance with certain embodiments. The aggregated file 300 may be a pre-allocated aggregated file. An object 310 in the aggregated file 300 has the following fields: "Content Object Key", "Timestamp", "Size", "Delete flag", "On-Hold flag", "Content", "Checksum", and "Padding". The "Content Object Key" field stores the content object key for identification purposes. The "Timestamp" field stores the timestamp (e.g., date, hour, seconds represented as a number in milliseconds) when the content object file was last modified. The "Size" field indicates the size of the content object file. The "Delete flag" field indicates whether this content object file is marked to be deleted. The "On-Hold flag" field indicates whether this content object file is put on-hold or locked. If the "On-Hold" flag is set, the content object file cannot be deleted or altered. The "Content" field stores the content. The "Checksum" field is used for checking data integrity of the content. The "Padding" field is used for an alignment purpose.

When creating a content object file, the COA system 120a . . . 120n creates an index entry in the indexing structure. For example, creating a content object file with a name "claim.tif" adds an index entry in the indexing structure. The entry may look like the following:

Content object name: claim.tif
Content object version: 1
Content object key: 3e6c90ad8f108b31
Address: 9.11.22.33
Name: File_0
Offset: 3d40
Size: 13540

With this example, the COA system 120a . . . 120n uploads the content of the content object into offset 3d40 in the aggregated file File_0, which is located at a storage node with address 9.11.22.33. The COA system 120a . . . 120n also loads metadata of the content object file with the content, which includes content object key, timestamp of creation, size, delete flag (e.g., false as default value), on-hold flag (e.g., false as default value), checksum, and padding.

When retrieving a content object file, the COA system 120a . . . 120n uses the content object key in conjunction with the content object location (address, name, offset, and size) to obtain the content object file from the appropriate storage node. The content object key in conjunction with the content object location (address, name, offset, and size) also allows the storage node to return the content object file. If versioning is enabled, the content object version number is used to direct to the proper content object key, otherwise, the one version of the content object file is returned.

When updating a content object file with versioning, the COA system 120a . . . 120n creates a new entry with the same content object name, but with a different content object key and a different content object location in the indexing structure. The content object version number of this new entry is computed by increasing the previous content object version number by 1. The COA system 120a . . . 120n loads the updated content object file into the designated aggregated file.

When updating a content object file without versioning, the COA system 120a . . . 120n locates the current content object in the aggregated file and marks the delete flag as true for deletion. Next, the COA system 120a . . . 120n removes the current index entry from the indexing structure. Then, the COA system 120a . . . 120n creates a new index entry with the same content object name, but with a different content object key and a different content object location. The COA system 120a . . . 120n loads the updated content object file into the designated aggregated file, and the content object version number remains 1 (i.e., no versioning).

When deleting a content object file with versioning, the COA system 120a . . . 120n locates the specified version of the content object file by the content object key and its content object location. The COA system 120a . . . 120n marks the delete flag of that content object file as true for deletion. Then, the COA system 120a . . . 120n removes the associated index entry from the indexing structure.

When deleting a content object file without versioning, the COA system 120a . . . 120n locates the one content object version of the content object file by the content object key and its content object location. The COA system 120a . . . 120n marks the delete flag of that content object file as true for deletion. Then, the COA system 120a . . . 120n removes the associated index entry from the indexing structure.

In certain embodiments, a deferred deletion model is adopted. With such embodiments, a periodic compaction process is executed on a storage node to remove those content object files that are marked "delete". The actual time and frequency of running the compaction is configurable.

A content object file may be put on hold ("locked") to preventing the content object file from unauthorized alteration or deletion. When the on-hold flag of a content object file is true, that content cannot be updated or deleted. This is an advantageous feature for retention management.

Storage nodes are monitored by a storage node manager. If one of the storage nodes is reaching a threshold of capacity, the storage node manager provisions additional storage nodes for scaling out. The capacity threshold is configurable. After a storage node reaches the threshold, no creation and update of a content object file is allowed for that storage node. A periodic compaction may release available space, and the storage node will be available for creation and updating of content object files again.

Certain embodiments provide a replication policy that is configurable to advantageously help the system administrator define storage node replication. For example, there may be a default of 3 replications of every content object file. Then, three storage nodes are used to store the 3 replications of every content object file, with one of the storage nodes being a master storage node, and the other storage nodes being secondary storage nodes. For a parallel replication scheme, all creation and updates are executed concurrently to the 3 storage nodes (and one of these storage nodes will be the master storage node that is used for retrieval). For a serial replication scheme, all creation and updates are executed on the master storage node. The master storage node replicates the changes to a first secondary storage node, and the first secondary storage node replicates the changes to a second secondary storage node, in sequence. If a master storage node fails, a secondary storage node becomes a master storage node to continue supporting the operations. A new storage node is also provisioned as a replacement for the failed master storage node, with replicated content object files.

Figure 4:
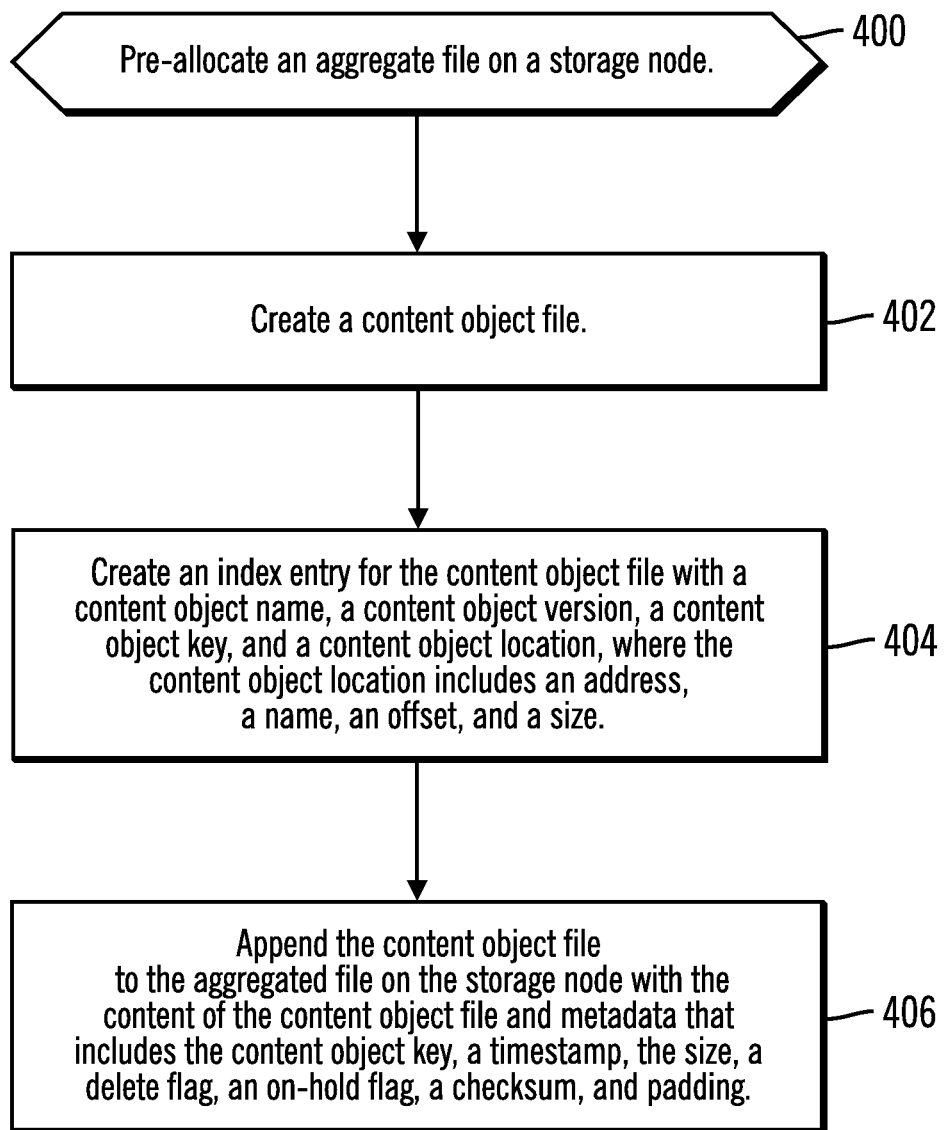
FIG. 4 illustrates, in a flowchart, operations for creating a content object file in accordance with certain embodiments.

FIG. 4 illustrates, in a flowchart, operations for creating a content object file in accordance with certain embodiments. Control begins at block 400 with the COA system on a computing device pre-allocating an aggregated file on a storage node. In block 402, the COA system creates a content object file. In certain embodiments, the content object file is smaller in size than a size of the pre-allocated aggregated file. In certain embodiments, the COA system creates a temporary content object file that is appended into the pre-allocated aggregated file, along with metadata. In block 404, the COA system creates an index entry for the content object file with a content object name, a content object version, a content object key, and a content object location, where the content object location includes an address, a name, an offset, and a size. In block 406, the COA system appends the content object file to the aggregated file on the storage node with the content of the content object file and metadata that includes the content object key, a timestamp, the size, a delete flag, an on-hold flag, a checksum, and padding.

Figure 5:
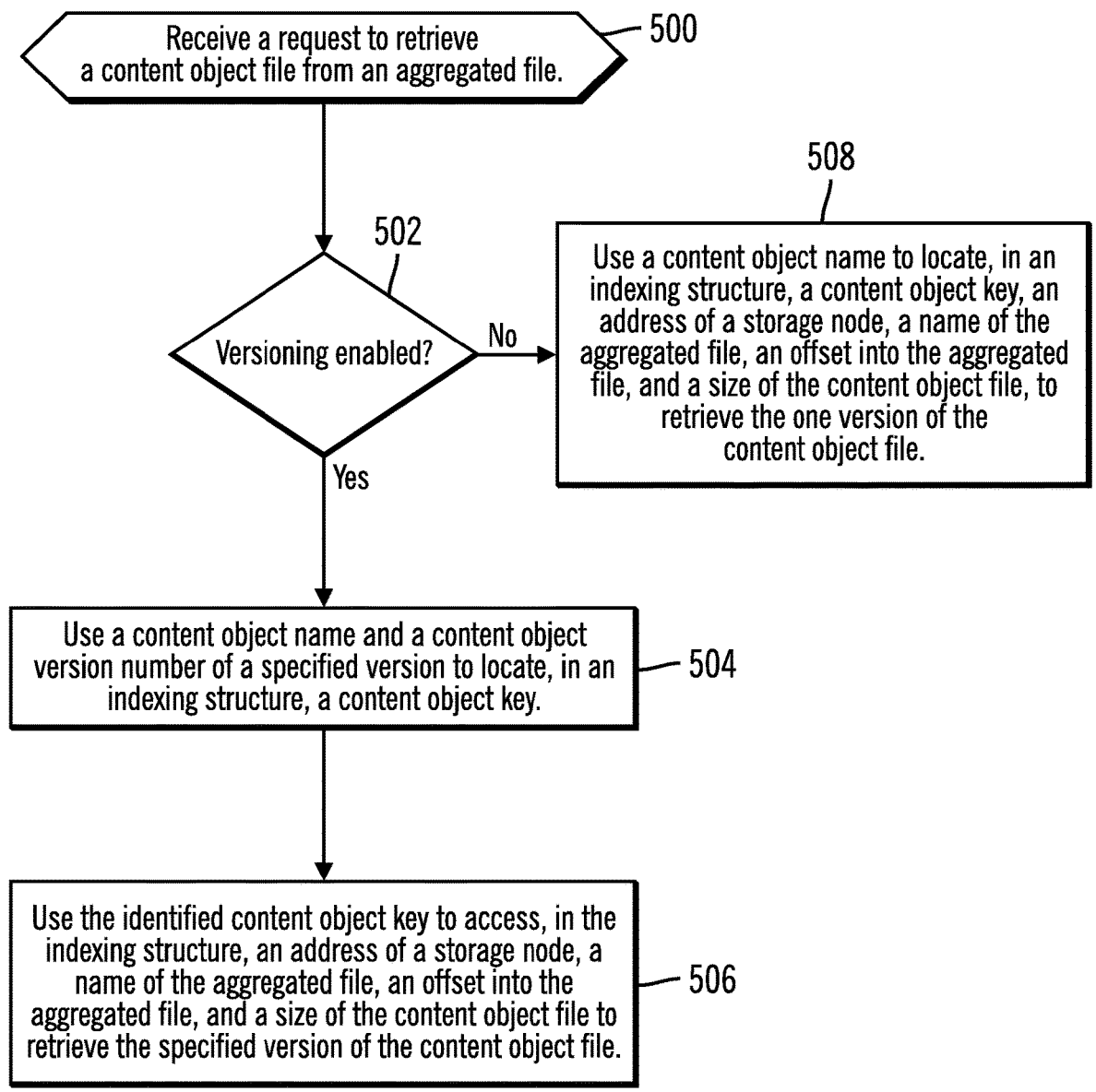
FIG. 5 illustrates, in a flowchart, operations for retrieving a content object file in accordance with certain embodiments.

FIG. 5 illustrates, in a flowchart, operations for retrieving a content object file in accordance with certain embodiments. Control begins at block 500 with the COA system receiving a request to retrieve a content object file from an aggregated file. The request to retrieve specifies that 1) this is a retrieve request, 2) a content object name, and 3) a content object version number, if versioning is enabled. In block 502, the COA system determines whether versioning is enabled. If so, processing continues to block 504, otherwise, processing continues to block 508.

When versioning is enabled, in block 504, the COA system uses a content object name and a content object version number of a specified version to locate, in the indexing structure, a content object key. In block 506, the COA system uses the identified content object key to access, in the indexing structure, an address of a storage node, a name of the aggregated file, an offset into the aggregated file, and a size of the content object file to retrieve the specified version of the content object file.

When versioning is not enabled, in block 508, the COA system uses a content object name to locate, in the indexing structure, a content object key, an address of a storage node, a name of the aggregated file, an offset into the aggregated file, and a size of the content object file, to retrieve the one version of the content object file.

Figure 6:
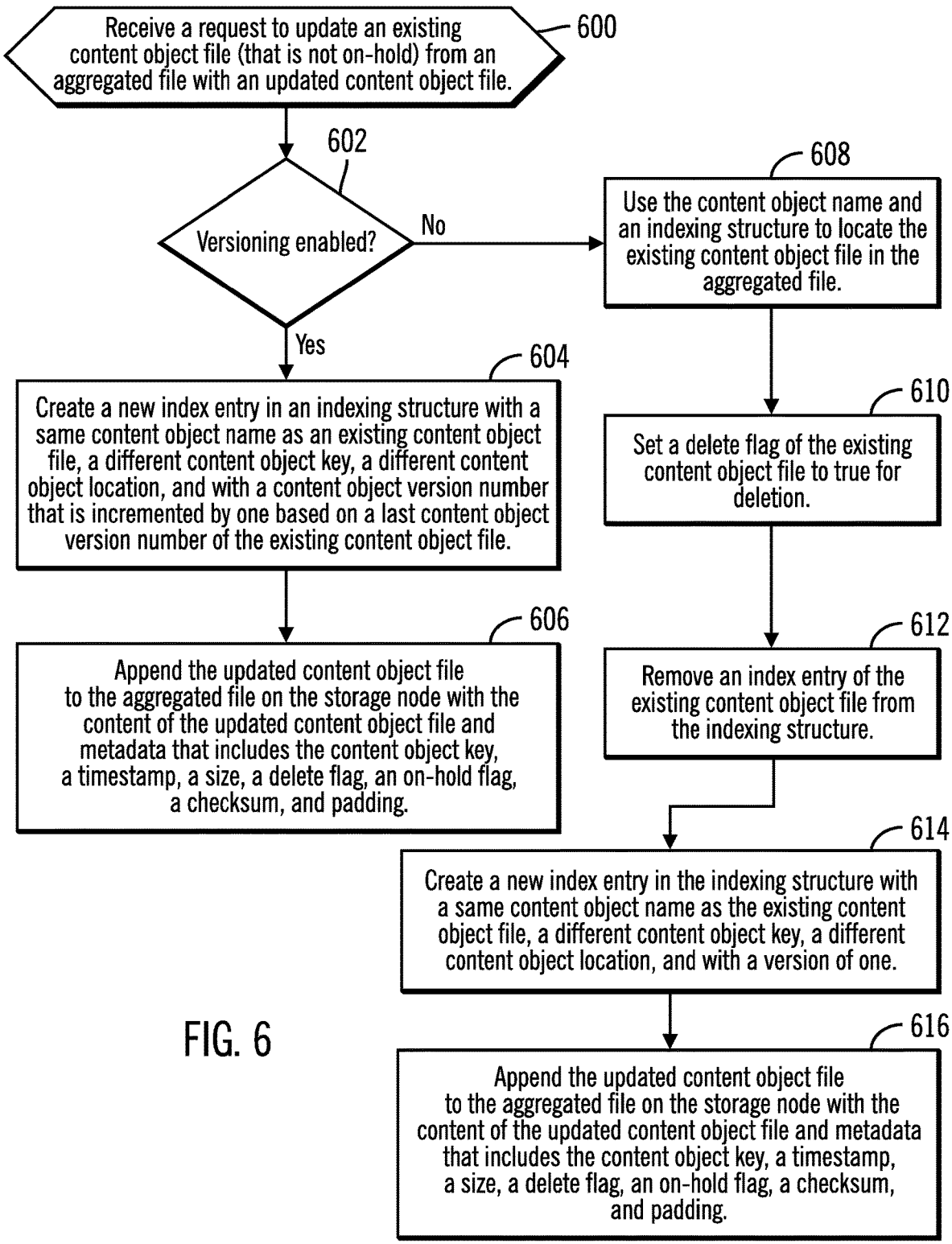
FIG. 6 illustrates, in a flowchart, operations for updating a content object file in accordance with certain embodiments.

FIG. 6 illustrates, in a flowchart, operations for updating a content object file in accordance with certain embodiments. Control begins at block 600 with the COA system receiving a request to update an existing content object file (that is not on-hold) from an aggregated file with an updated content object file. The request to update specifies that 1) this is an update request and 2) a content object name. For an update request, a version number is not required as different versions are given different content object keys. In block 602, the COA system determines whether versioning is enabled. If so, processing continues to block 604, otherwise, processing continues to block 608.

When versioning is enabled, in block 604, the COA system creates a new index entry in an indexing structure with a same content object name as an existing content object file, a different content object key, a different content object location, and with a content object version number that is incremented by one based on a last content object version number of the existing content object file. In block 606, the COA system appends the updated content object file to the aggregated file on the storage node with the content of the updated content object file and metadata that includes the content object key, a timestamp, the size, a delete flag, an on-hold flag, a checksum, and padding.

When versioning is not enabled, in block 608, the COA system uses the content object name and the indexing structure to locate the existing content object file in the aggregated file. In block 610, the COA system sets a delete flag of the existing content object file to true for deletion. In block 612, the COA system removes an index entry of the existing content object file from the indexing structure. In block 614, the COA system creates a new index entry in the indexing structure with a same content object name as the existing content object file, a different content object key, a different content object location, and with a version of one. In block 616, the COA system appends the updated content object file to the aggregated file on the storage node with the content of the updated content object file and metadata that includes the content object key, a timestamp, the size, a delete flag, an on-hold flag, a checksum, and padding.

Figure 7:
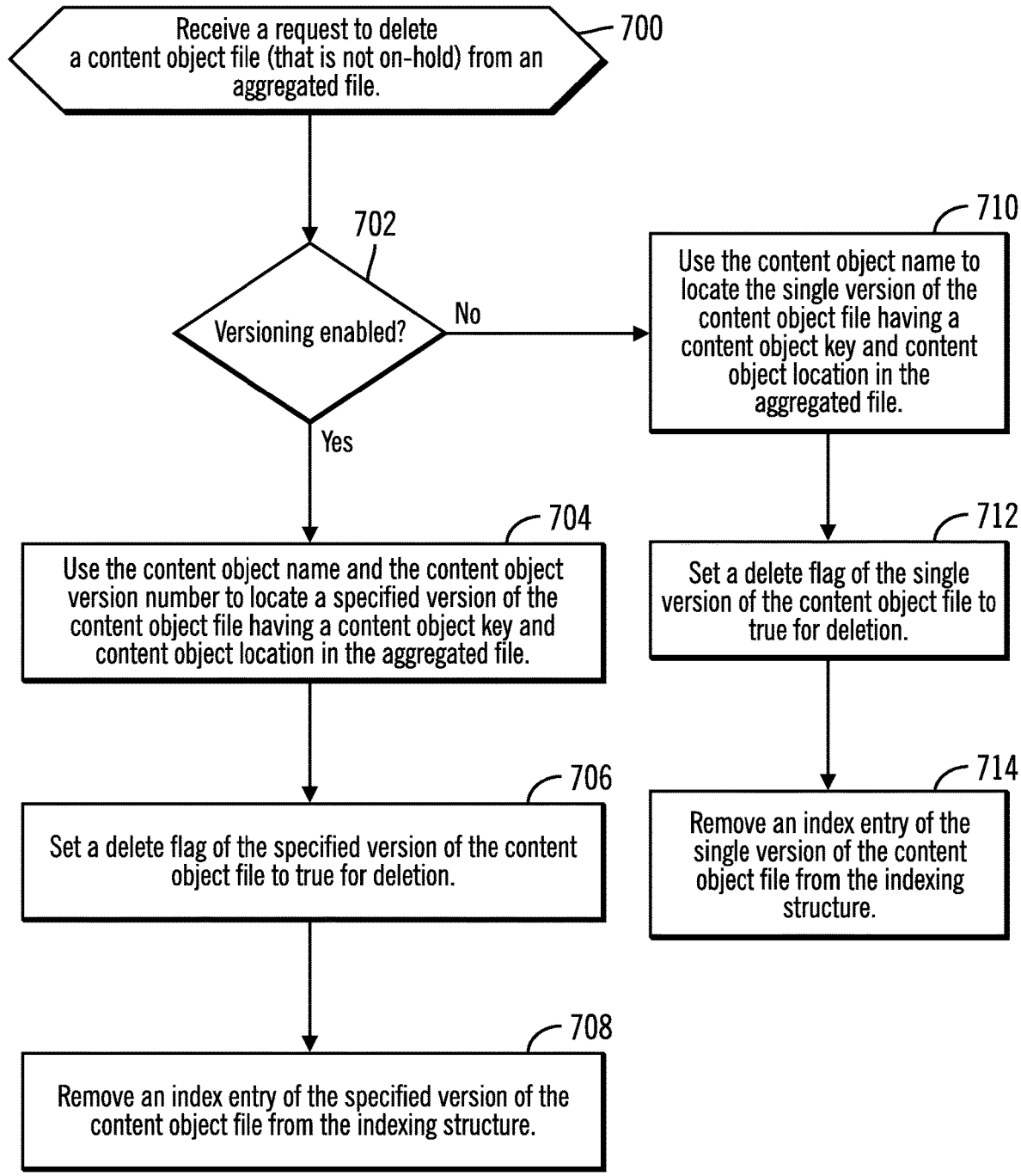
FIG. 7 illustrates, in a flowchart, operations for deleting a content object file in accordance with certain embodiments.

FIG. 7 illustrates, in a flowchart, operations for deleting a content object file in accordance with certain embodiments. Control begins at block 700 with the COA system receiving a request to delete a content object file (that is not on-hold) from an aggregated file. The request to retrieve specifies that 1) this is a delete request, 2) a content object name, and 3) a version number, if versioning is enables. In block 702, the COA system determines whether versioning is enabled. If so, processing continues to block 704, otherwise, processing continues to block 710.

When versioning is enabled, in block 704, the COA system uses the content object name and the content object version number to locate a specified version of the content object file having a content object key and content object location in the aggregated file. In block 706, the COA system sets a delete flag of the specified version of the content object file to true for deletion. In block 708, the COA system removes an index entry of the specified version of the content object file from the indexing structure.

When versioning is not enabled, in block 710, the COA system uses the content object name to locate the single version of the content object file having a content object key and content object location in the aggregated file. In block 712, the COA system sets a delete flag of the single version of the content object file to true for deletion. In block 714, the COA system removes an index entry of the single version of the content object file from the indexing structure.

Figure 8:
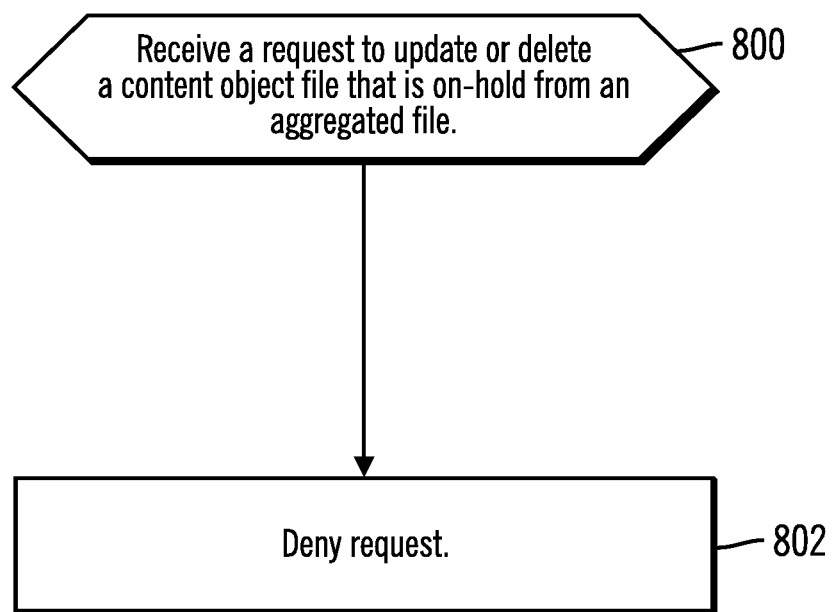
FIG. 8 illustrates, in a flowchart, operations for a content object file that is on-hold in accordance with certain embodiments.

FIG. 8 illustrates, in a flowchart, operations for a content object file that is on-hold in accordance with certain embodiments. Control begins at block 800 with the COA system receiving a request to update or delete a content object file that is on-hold from an aggregated file. In block 802, the COA system denies the request.

Figure 9:
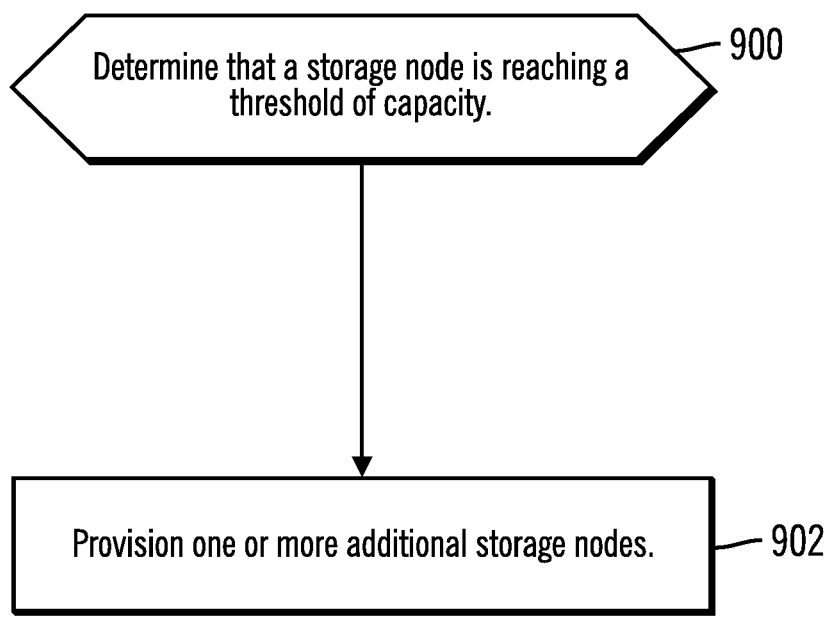
FIG. 9 illustrates, in a flowchart, operations for provisioning one or more storage nodes in accordance with certain embodiments.

FIG. 9 illustrates, in a flowchart, operations for provisioning one or more storage nodes in accordance with certain embodiments. Control begins at block 900 with the COA system determining that a storage node is reaching a threshold of capacity. In block 902, the COA system provisions one or more additional storage nodes.

Figure 10:
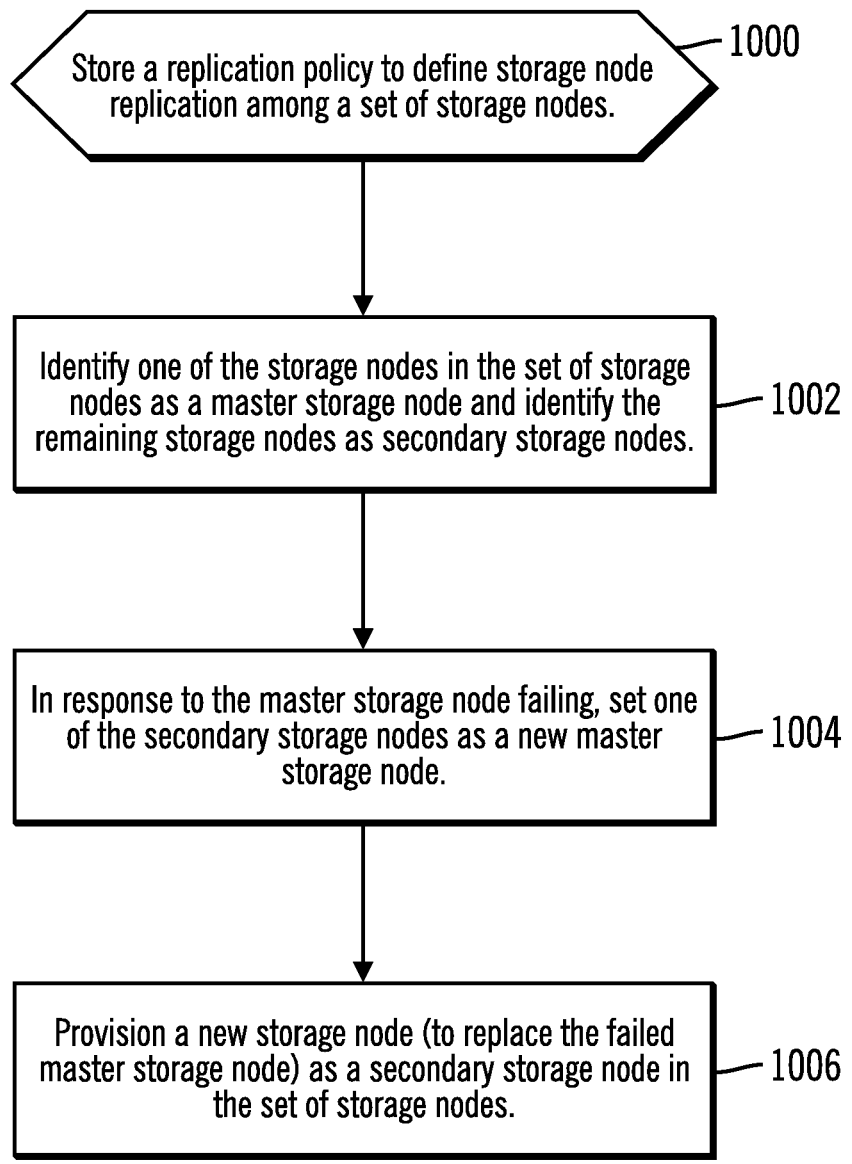
FIG. 10 illustrates, in a flowchart, operations for implementing a replication policy in accordance with certain embodiments.

FIG. 10 illustrates, in a flowchart, operations for implementing a replication policy in accordance with certain embodiments. Control begins at block 1000 with the COA system storing a replication policy to define storage node replication among a set of storage nodes. In block 1002, the COA system identifies one of the storage nodes in the set of storage nodes as a master storage node and identify the remaining storage nodes as secondary storage nodes. In block 1004, the COA system, in response to the master storage node failing, sets one of the secondary storage nodes as a new master storage node. In block 1006, the COA system provisions a new storage node (to replace the failed master storage node) as a secondary storage node in the set of storage nodes.

Embodiments manage aggregated content object files in aggregated files with content indexing in an indexing structure.

Embodiments efficiently store a large number of content object files (e.g., small files) and resolve the small object problem for content management systems. Embodiments address the complications that arise due to the support for versioning, legal hold, and tiered storage in a typical content management system.

Embodiments append a content object file to an aggregated file inside the repository for persistent storage. With embodiments, the aggregated files with the appended content object files are read-write capable and transactional.

Figure 11:
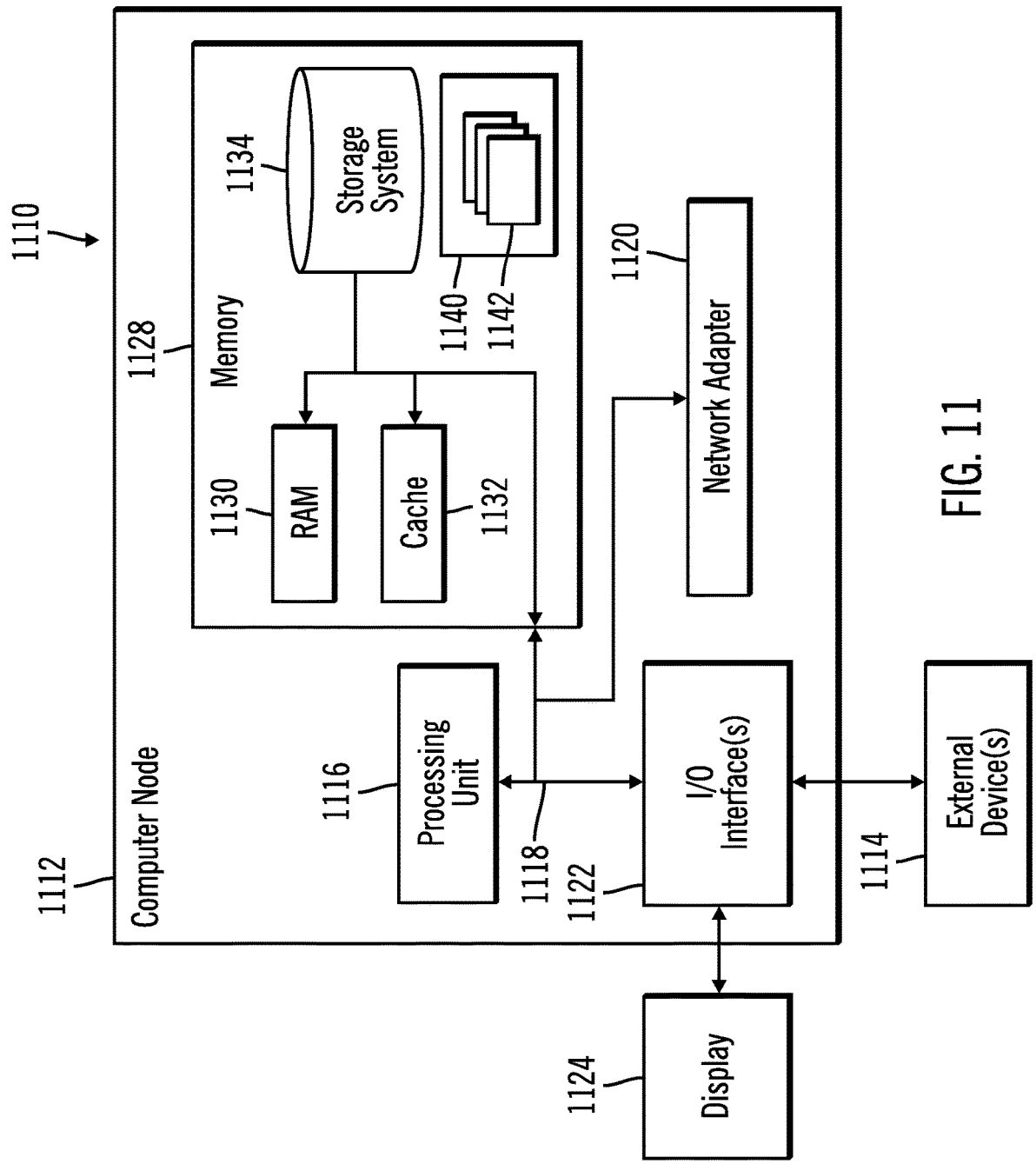
FIG. 11 illustrates a computing node in accordance with certain embodiments.

Referring now to FIG. 11, a schematic of an example of a computing node is shown. Computing node 1110 is only one example of a suitable computing node and is not intended to suggest any limitation as to the scope of use or functionality of embodiments of the invention described herein. Regardless, computing node 1110 is capable of being implemented and/or performing any of the functionality set forth hereinabove.

In computing node 1110 there is a computer system/server 1112, which is operational with numerous other general purpose or special purpose computing system environments or configurations. Examples of well-known computing systems, environments, and/or configurations that may be suitable for use with computer system/server 1112 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1112 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 1112 in computing node 1110 is shown in the form of a general-purpose computing device. The components of computer system/server 1112 may include, but are not limited to, one or more processors or processing units 1116, a system memory 1128, and a bus 1118 that couples various system components including system memory 1128 to processor 1116.

Bus 1118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1112 typically includes a variety of computer system readable media. Such media may be any available media that is accessible by computer system/server 1112, and it includes both volatile and non-volatile media, removable and non-removable media.

System memory 1128 can include computer system readable media in the form of volatile memory, such as random access memory (RAM) 1130 and/or cache memory 1132. Computer system/server 1112 may further include other removable/non-removable, volatile/non-volatile computer system storage media. By way of example only, storage system 1134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1118 by one or more data media interfaces. As will be further depicted and described below, memory 1128 may include at least one program product having a set (e.g., at least one) of program modules that are configured to carry out the functions of embodiments of the invention.

Program/utility 1140, having a set (at least one) of program modules 1142, may be stored in memory 1128 by way of example, and not limitation, as well as an operating system, one or more application programs, other program modules, and program data. Each of the operating system, one or more application programs, other program modules, and program data or some combination thereof, may include an implementation of a networking environment. Program modules 1142 generally carry out the functions and/or methodologies of embodiments of the invention as described herein.

Computer system/server 1112 may also communicate with one or more external devices 1114 such as a keyboard, a pointing device, a display 1124, etc.; one or more devices that enable a user to interact with computer system/server 1112; and/or any devices (e.g., network card, modem, etc.) that enable computer system/server 1112 to communicate with one or more other computing devices. Such communication can occur via Input/Output (I/O) interfaces 1122. Still yet, computer system/server 1112 can communicate with one or more networks such as a local area network (LAN), a general wide area network (WAN), and/or a public network (e.g., the Internet) via network adapter 1120. As depicted, network adapter 1120 communicates with the other components of computer system/server 1112 via bus 1118. It should be understood that although not shown, other hardware and/or software components could be used in conjunction with computer system/server 1112. Examples, include, but are not limited to: microcode, device drivers, redundant processing units, external disk drive arrays, RAID systems, tape drives, and data archival storage systems, etc.

In certain embodiments, each computing device 100a . . . 100n and/or storage node 150a . . . 150n has the architecture of computing node 1110. In certain embodiments, each computing device 100a . . . 100n and/or storage node 150a . . . 150n is part of a cloud environment. In certain alternative embodiments, each computing device 100a . . . 100n and/or storage node 150a . . . 150n is not part of a cloud environment.

Cloud Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 12:
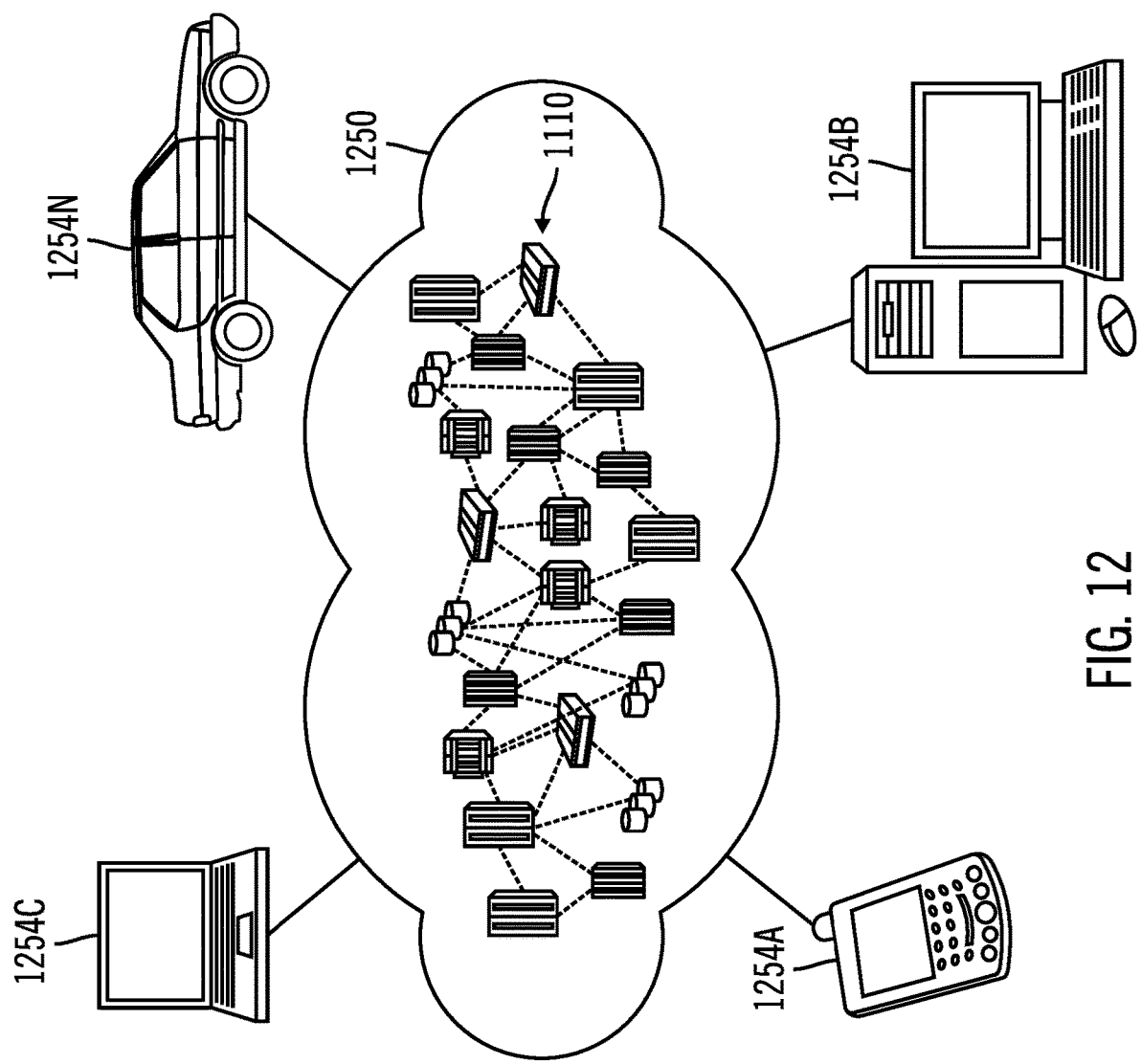
FIG. 12 illustrates a cloud computing environment in accordance with certain embodiments.

Referring now to FIG. 12, illustrative cloud computing environment 1250 is depicted. As shown, cloud computing environment 1250 comprises one or more cloud computing nodes 1110 with which local computing devices used by cloud consumers, such as, for example, personal digital assistant (PDA) or cellular telephone 1254A, desktop computer 1254B, laptop computer 1254C, and/or automobile computer system 1254N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 12 are intended to be illustrative only and that computing nodes 1110 and cloud computing environment 1250 can communicate with any type of computerized device over any type of network and/or network addressable connection (e.g., using a web browser).

Figure 13:
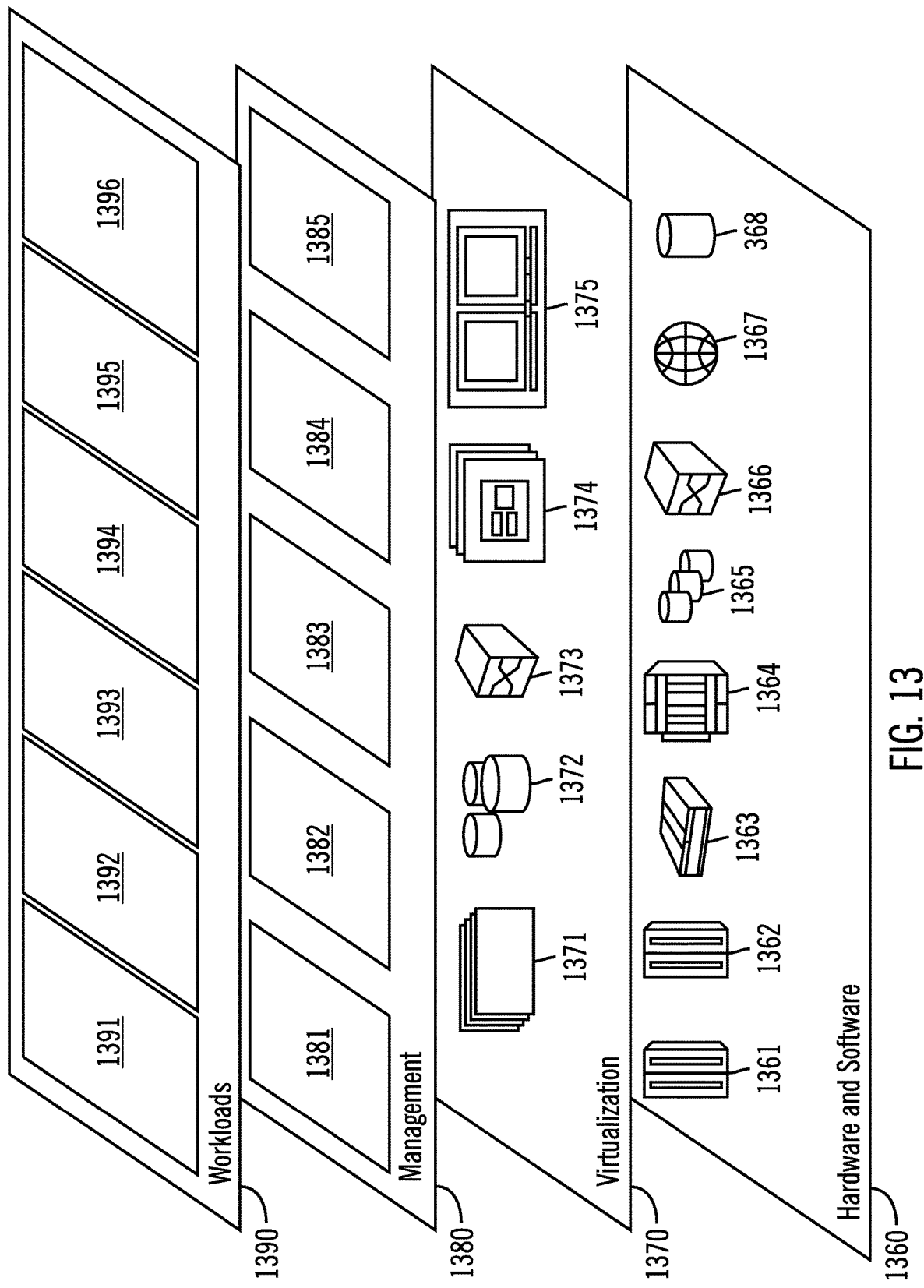
FIG. 13 illustrates abstraction model layers in accordance with certain embodiments.

Referring now to FIG. 13, a set of functional abstraction layers provided by cloud computing environment 1250 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 1360 includes hardware and software components. Examples of hardware components include: mainframes 1361; RISC (Reduced Instruction Set Computer) architecture based servers 1362; servers 1363; blade servers 1364; storage devices 1365; and networks and networking components 1366. In some embodiments, software components include network application server software 1367 and database software 1368.

Virtualization layer 1370 provides an abstraction layer from which the following examples of virtual entities may be provided: virtual servers 1371; virtual storage 1372; virtual networks 1373, including virtual private networks; virtual applications and operating systems 1374; and virtual clients 1375.

In one example, management layer 1380 may provide the functions described below. Resource provisioning 1381 provides dynamic procurement of computing resources and other resources that are utilized to perform tasks within the cloud computing environment. Metering and Pricing 1382 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1383 provides access to the cloud computing environment for consumers and system administrators. Service level management 1384 provides cloud computing resource allocation and management such that required service levels are met. Service Level Agreement (SLA) planning and fulfillment 1385 provide pre-arrangement for, and procurement of, cloud computing resources for which a future requirement is anticipated in accordance with an SLA.

Workloads layer 1390 provides examples of functionality for which the cloud computing environment may be utilized. Examples of workloads and functions which may be provided from this layer include: mapping and navigation 1391; software development and lifecycle management 1392; virtual classroom education delivery 1393; data analytics processing 1394; transaction processing 1395; and optimized content object storage 1396.

Thus, in certain embodiments, software or a program, implementing optimized content object storage in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising operations for:
   in response to determining that a storage node has not reached a threshold of capacity,
      creating, with a processor of a computer, on the storage node, an aggregated file that includes a plurality of content object files, wherein a content object file of the plurality of content object files in the aggregated file has a plurality of versions, and wherein each version of the content object file is associated with a delete flag;
   in response to receiving, with the processor of the computer, a request to delete a specific version of the content object file, wherein the request specifies a content object name and a content object version number of the specific version of the content object file,
      determining, with the processor of the computer, a content object location of the specific version of the content object file in the aggregated file based on the content object name and the content object version number of the specific version of the content object file; and
      deleting, with the processor of the computer, the specific version of the content object file from the aggregated file based on the content object location and the delete flag associated with the specific version of the content object file; and
   in response to receiving, with the processor of the computer, a request to update the aggregated file with a new version of the content object file, appending the new version of the content object file to the aggregated file;
   in response to determining that the storage node has reached the threshold of capacity, provisioning an additional storage node.

2. The computer-implemented method of claim 1, further comprising operations for:
   determining, with the processor of the computer, a content object key of the specific version of the content object file in the aggregated file based on the content object name and the content object version number of the specific version of the content object file.

3. The computer-implemented method of claim 2, wherein the content object key comprises a timestamp, a size, the delete flag, an on-hold flag, content, and a checksum.

4. The computer-implemented method of claim 1, wherein the specific version of the content object file is further associated with a timestamp of creation and a checksum.

5. The computer-implemented method of claim 1, wherein the specific version of the content object file is further associated with an on-hold flag, and wherein the specific version of the content object file is not deleted when the on-hold flag indicates that the specific version of the content object file is on hold.

6. The computer-implemented method of claim 1, further comprising operations for:
   implementing, with the processor of the computer, a replication policy.

7. The computer-implemented method of claim 1, wherein a Software as a Service (SaaS) is configured to perform the operations of the computer-implemented method.

8. A computer program product, the computer program product comprising a computer readable storage medium having program code embodied therewith, the program code executable by at least one processor to perform operations for:
   in response to determining that a storage node has not reached a threshold of capacity,
      creating, on the storage node, an aggregated file that includes a plurality of content object files, wherein a content object file of the plurality of content object files in the aggregated file has a plurality of versions, and wherein each version of the content object file is associated with a delete flag;
   in response to receiving a request to delete a specific version of the content object file, wherein the request specifies a content object name and a content object version number of the specific version of the content object file,
      determining a content object location of the specific version of the content object file in the aggregated file based on the content object name and the content object version number of the specific version of the content object file; and
      deleting the specific version of the content object file from the aggregated file based on the content object location and the delete flag associated with the specific version of the content object file; and in response to receiving a request to update the aggregated file with a new version of the content object file, appending the new version of the content object file to the aggregated file;

in response to determining that the storage node has reached the threshold of capacity, provisioning an additional storage node.

9. The computer program product of claim 8, wherein the program code is executable by the at least one processor to perform further operations for:

determining a content object key of the specific version of the content object file in the aggregated file based on the content object name and the content object version number of the specific version of the content object file.

10. The computer program product of claim 9, wherein the content object key comprises a timestamp, a size, the delete flag, an on-hold flag, content, and a checksum.

11. The computer program product of claim 8, wherein the specific version of the content object file is further associated with a timestamp of creation and a checksum.

12. The computer program product of claim 8, wherein the specific version of the content object file is further associated with an on-hold flag, and wherein the specific version of the content object file is not deleted when the on-hold flag indicates that the specific version of the content object file is on hold.

13. The computer program product of claim 8, wherein the program code is executable by the at least one processor to perform further operations for:

implementing a replication policy.

14. The computer program product of claim 8, wherein a Software as a Service (SaaS) is configured to perform the operations of the computer program product.

15. A computer system, comprising:

one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising:

in response to determining that a storage node has not reached a threshold of capacity, creating, on the storage node, an aggregated file that includes a plurality of content object files, wherein a content object file of the plurality of content object files in the aggregated file has a plurality of versions, and wherein each version of the content object file is associated with a delete flag;

in response to receiving a request to delete a specific version of the content object file, wherein the request specifies a content object name and a content object version number of the specific version of the content object file, determining a content object location of the specific version of the content object file in the aggregated file based on the content object name and the content object version number of the specific version of the content object file; and deleting the specific version of the content object file from the aggregated file based on the content object location and the delete flag associated with the specific version of the content object file; and in response to receiving a request to update the aggregated file with a new version of the content object file, appending the new version of the content object file to the aggregated file;

in response to determining that the storage node has reached the threshold of capacity, provisioning an additional storage node.

16. The computer system of claim 15, wherein the operations further comprise:

determining a content object key of the specific version of the content object file in the aggregated file based on the content object name and the content object version number of the specific version of the content object file.

17. The computer system of claim 16, wherein the content object key comprises a timestamp, a size, the delete flag, an on-hold flag, content, and a checksum.

18. The computer system of claim 15, wherein the specific version of the content object file is further associated with a timestamp of creation and a checksum.

19. The computer system of claim 15, wherein the specific version of the content object file is further associated with an on-hold flag, and wherein the specific version of the content object file is not deleted when the on-hold flag indicates that the specific version of the content object file is on hold.

20. The computer system of claim 15, wherein the operations further comprise:

implementing a replication policy.

21. The computer system of claim 15, wherein a Software as a Service (SaaS) is configured to perform the operations of the computer system.

* * * * *